Figure 1:
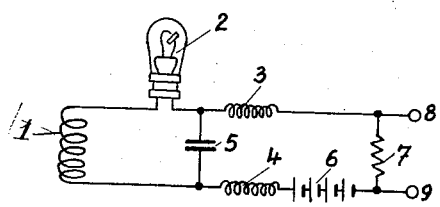

April 13, 1937.  H. EBERHARD ET AL  2,077,314
DEVICE FOR DISTANT CONTROL
Filed Dec. 23, 1932

Inventors:
Heinrich Eberhard
Mathys Götzke

Patented Apr. 13, 1937

2,077,314

UNITED STATES PATENT OFFICE 2,077,314

DEVICE FOR DISTANT CONTROL

Heinrich Eberhard and Walther Gutzke, Berlin, Germany

Application December 23, 1932, Serial No. 648,616
In Germany December 24, 1931

4 Claims. (Cl. 250—36)

The subject matter of the invention is a supervisory or checking device, which may be employed for distant control, for example, for wave control, especially of radio transmitters the regulation of circumferential velocities, or also for all other purposes in which there is required the distant indication of desired values.

The device operates with the use of piezoelectrical frequency normals of the kind known per se. Arrangements of this kind are known in themselves. The subject matter of the application, however, differs fundamentally from these known arrangements by the fact that the piezoelectrical frequency standard is employed solely as relay, which serves the purpose of completing a stationary circuit, which in turn is capable of controlling an amplifying arrangement, in the anode circuit of which there is provided a desired indicating or control instrument.

By the combination of two frequency standards in the connection system according to the invention it is furthermore possible to obtain extremely simple regulation or control of a desired machine—for example, of a radio transmitter—within extremely narrow frequency limits, as the frequency standards employed permit of balancing up to within very few periods.

Two forms of embodiment of the arrangement according to the invention are illustrated by way of example in the drawing.

Figure 2:
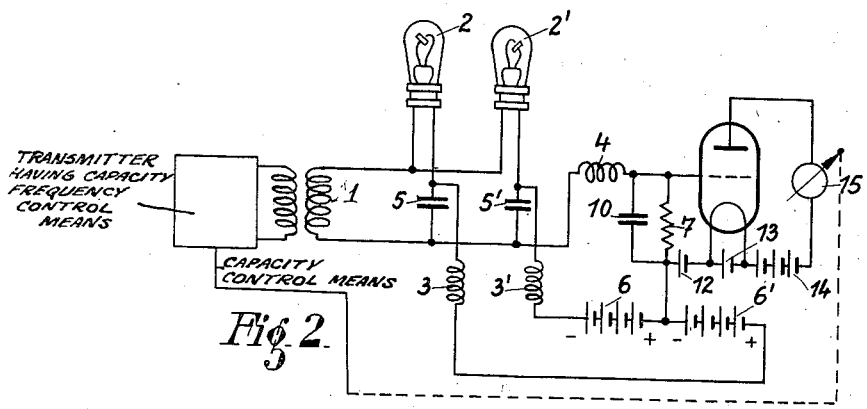

Fig. 1 shows an arrangement with merely one frequency standard, such as may be employed for desired checking purposes in connection with suitable arrangement for distant control. Fig. 2 illustrates an arrangement having two frequency standards to be employed for the same purposes. In this Fig. 1, 1 is the input circuit coil. A choke coil 4, the input coil 1, a frequency standard 2, another choke coil 3 and a resistance 7 are connected in series in the order named across a D. C. source 6. A condenser 5 is connected across the frequency standard 2 and the input coil 1. The terminals 8 and 9, which may be the input terminals of an amplifying arrangement, are connected across the resistor 7. Naturally, the signaling instrument may be connected in immediate fashion at 8 and 9 if desired. In the state of rest the battery circuit 6, 4, 1, 2, 3, 8, 7, 9 is interrupted at 2. If, however, the frequency standard is excited by a frequency which is equal to its own frequency, there is formed in the oscillator valve 2 an ionized conductive path, by means of which the battery circuit is completed, so that the indicating instrument connected with the terminals 8 and 9 now indicates the passage of current. Since the ionization is directly proportional to the intensity of the high frequency received, the arrangement also permits of recording of the strength of the oncoming impulses. The arrangement is extremely sensitive, as the actual control current is taken from the stationary battery, which may be such that even in the case of the least ionization—that is to say, when the high frequency impulses received are merely very weak, an adequate control effect is attained.

In Fig. 2, a choke coil 3, a frequency standard 2, an input coil 1, a choke coil 4 and a resistance 7 and condenser 10 in parallel are connected in series in the order named across a D. C. source 6', the positive terminal of said source being connected to the choke coil 3. A second D. C. source 6 is connected to have its positive terminal connected to the negative terminal of the source 6' and its negative terminal connected through a choke coil 3' to one terminal of a second frequency standard 2'. The other terminal of the frequency standard 2' is connected to the terminal of the frequency standard 2 which is directly connected to the input coil. A condenser 5' is connected across the frequency standard 2' and the input coil 1. An amplifying valve has its cathode and grid connected across the parallel combination of condenser 10 and resistance 7 in series with the conventional grid biasing battery 12. The battery 13 is connected to heat the cathode of the valve. Connected between the anode and cathode of the valve is an indicating or control instrument 15 in series with a battery 18. Coupled to the input coil 1 is a transmitter having a capacity frequency control means and this transmitter may be controlled in frequency by the instrument 15 in a well known manner. If now by reason of a high frequency impulse received at 1 one of the two oscillators 2 and 2' is excited so as to oscillate, the grid of the amplifying valve will be charged either positively or negatively, the feed current of the indicating instrument correspondingly amplified or weakened, and the instrument moved out of the position of rest in the one or the other direction. If, for example, the frequency standard 2 is excited by oncoming high frequency oscillations of its own frequency, the circuit 1, 2, 3, 6', 7, 4 is completed at 2, the grid of the amplifying valve charged positively, and the feed current of the indicating instrument amplified. If on the other hand the oscillator 2' is excited, the circuit 1, 2', 3', 6, 7, 4 is completed at 2', the grid of the amplifying valve charged negatively, and the feed current of the instrument correspondingly weakened.

It will be readily apparent that in this manner a desired generator or any other corresponding arrangement may be maintained constant within two extremely narrow limits, which are determined by the difference in frequency of the two frequency standards. It is possible, for example, in this manner to maintain constant a high frequency transmitter, after the same has been once regulated in accordance with the feed current position, within the narrow limits determined by the difference between the two frequency standards, with the assistance of suitable regulating means, for example means which vary the capacity of the transmitting circuit. Conveniently the regulation of a transmitter of this kind may be performed in the first place manually with use of the optical effect (lighting) of the oscillators 2 and 2' as regulator, and after effected regulation a mechanical regulating means connected, which is controlled by the arrangement according to the invention and then maintains the constancy of the transmitter. The two condensers 5 and 5' are preferably each of 10,000 cm,, and the condenser 10 is furnished with a size of 2—4µF and serves to prevent short pendulum motions. The potential of the batteries 6 and 6' requires to be such that it is not sufficient in itself to maintain the ionization (lighting) effect in the oscillator, so that passage of the current is able to take place only when the piezo-electric crystal is excited by oscillations of its own frequency. In all arrangements there may be employed as indicating instrument an amplifying voltmeter, and as regulating device any desired relay of a suitable kind or, for certain special purposes, a control condenser.

Numerous other possibilities of connection are naturally also available as regards the arrangement according to the invention. It is merely essential as regards the invention that an indicating or regulating instrument is controlled with the assistance of two piezo-electrical oscillators or resonators, which are suitably connected, in such fashion that the same remains constant within the limits determined by the difference in frequency between the piezo-electrical standards.

We claim:

1. In a piezo-electric relaying device for distant control by variations of the normal frequency of electrical oscillations, two oscillatory circuits with a common input coil, each of said circuits containing a piezo-electric resonator, a condenser and said common input coil in series, each of said piezo-electric resonators consisting of a piezo-electric crystal between two electrodes in a gas-filled tube, the one of said oscillatory circuits tuned to a frequency greater than said normal controlling frequency, and the other oscillatory circuit tuned to a frequency smaller than said normal frequency, two sources of potential connected together in series and having two outside terminals, means for connecting one of said terminals between one of said crystals and its condensers, means for connecting the other of said terminals between said other crystal and said other condenser and relaying means connected between a point between said sources and a point between said common input coil and said condensers.

2. In a piezo-electric relaying device for distant control by variations of the normal frequency of electrical oscillations, two oscillatory circuits with a common input coil, each of said circuits containing a piezo-electric resonator, a condenser and said common input coil in series, each of said piezo-electric resonators consisting of a piezo-electric crystal between two electrodes in a gas-filled tube, the one of said oscillatory circuits tuned to a frequency greater than said normal controlling frequency, and the other oscillatory circuit tuned to a frequency smaller than said normal frequency, two sources of potential connected together in series and having two outside terminals, means for connecting one of said terminals between one of said crystals and its condenser, means for connecting the other of said terminals between said other crystal and said other condenser, an amplifying tube having an anode, cathode and grid, conductive means connected between said cathode and grid, a connection between said cathode and a point between said sources, a connection between said grid and a point between said condensers and said input coil through a choke coil and a relaying device connected between said anode and said cathode.

3. A device according to claim 2, in which said conductive means is a grid leak resistance and in which a condenser is connected thereacross.

4. A device according to claim 2, and additionally a frequency controllable transmitter whose output is coupled to said input coil and means whereby said relaying device controls the frequency of said transmitter.

HEINRICH EBERHARD.
WALTHER GUTZKE.